J. GERST.
ATTACHMENT FOR GATES.
APPLICATION FILED JUNE 24, 1912.
1,057,955.
Patented Apr. 1, 1913.
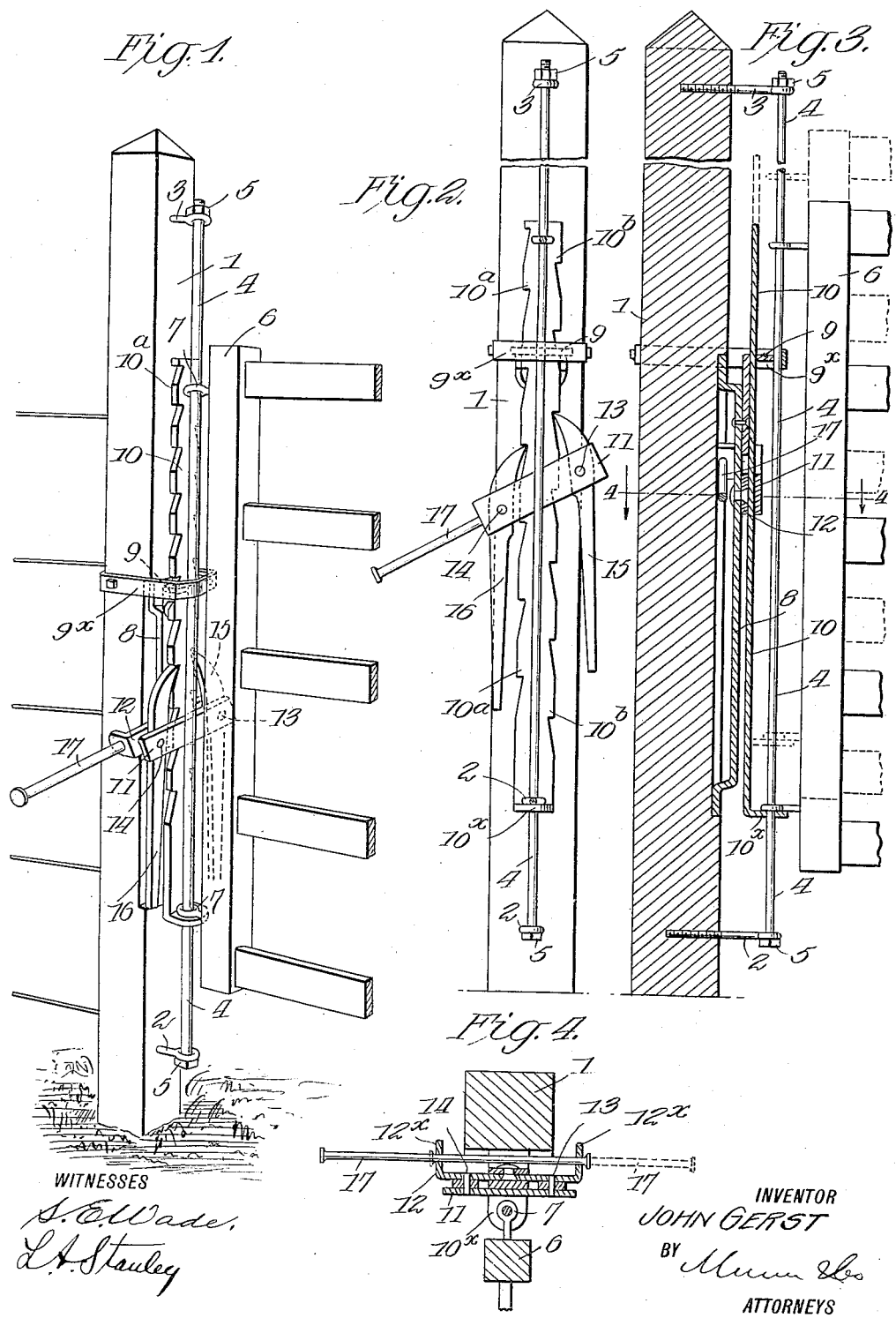
WITNESSES
INVENTOR
JOHN GERST
BY
ATTORNEYS

UNITED STATES PATENT OFFICE.

JOHN GERST, OF ALTON, IOWA.

ATTACHMENT FOR GATES.

1,057,955.  Specification of Letters Patent.  Patented Apr. 1, 1913.

Application filed June 24, 1912. Serial No. 705,537.

*To all whom it may concern:*

Be it known that I, JOHN GERST, a citizen of the United States, and a resident of Alton, in the county of Sioux and State of Iowa, have made certain new and useful Improvements in Attachments for Gates, of which the following is a specification.

My invention relates to attachments for gates, and it consists in the combinations, constructions, and arrangements herein described and claimed.

An object of my invention is to provide means by which a swinging gate may be raised or lowered at will.

A further object of my invention is to provide means for raising and lowering a gate and for maintaining the same at any desired height. Thus it is often desirable to raise a gate so as to permit young pigs to pass into a separate inclosure from the old hogs. This can be done very readily by the simple apparatus which comprises the main feature of this invention. Again it is sometimes desirable to separate animals such as hogs and sheep from other animals such as cattle and horses. The gate may be raised high enough to permit the passage of hogs or sheep, while the cattle and horses will be kept back.

A further object of my invention is to provide a simple device for accomplishing the above named objects.

Other objects and advantages will appear in the following specification and the novel features of the invention will be particularly pointed out in the appended claims.

My invention is illustrated in the accompanying drawings, forming part of this application in which similar reference characters indicate like parts in the several views, and in which—

Figure 1 is a perspective view showing my invention as applied to a swinging gate, Fig. 2 is a face view of the attachment, Fig. 3 is a longitudinal sectional view of the device, and Fig. 4 is a section along the line 4—4 of Fig. 3.

In carrying out my invention, I make use of a gate post 1 to which are secured a lower screw eye 2 and an upper screw eye 3. A rod 4 is disposed in these eyes, and is held in place by means of nuts 5. The gate 6 is provided with screw eyes 7, which surround the rod 4, so as to permit the gate to slide up and down thereon, and at the same time to have a pivotal movement around the rod.

To the post 1 is secured a U-shaped bracket 8 to the top portion of which is riveted or otherwise secured a guide member 9 having a slot through which a rack 10 is arranged to slide. The teeth on opposite sides of the rack are staggered, as shown in Fig. 2, at $10^a$ and $10^b$. The lower end of the rack is bent laterally to form a guide member $10^x$, this guide member being provided with an opening arranged to receive the rod 4. Disposed on one side of the rack 10 is an arm 11, while on the other side is an arm 12, which is pivoted upon the bracket 8. These two arms are joined together by means of the pins 13 and 14, the former serving as a pivotal support for a pawl 15, and the pivot 14 having mounted upon it the pawl 16. The arm 12 is bent laterally at each end, as shown at $2^x$ (see Fig. 4) and a handle 17 is slidably carried between the laterally bent parts. The rod 4 is braced by means of a collar $9^x$ which surrounds the post 1.

From the foregoing description of the various parts of the device, the operation thereof may be readily understood.

Let us suppose that the gate is in its lower position and a snow storm has caused drifts of snow to pack in around the lower part of the gate. The gate may be raised by pulling the slidable handle 17 toward the side of the gate upon which the operator is situated. Now by merely working the handle up and down in the manner of a pump the pawls will be caused to engage the teeth of the rack member 10 alternately, thereby raising the rack and with it the gate, since the latter is pushed upwardly by the portion $10^x$ which abuts the lower eye 2. The gate now may be swung above the snow drift. In order to release the gate it is only necessary to press inwardly on one of the free ends of the pawls 15 and 16 alternately, and at the same time work the lever, in order to take the weight off of the pawl that is being disengaged. The engaging tooth of each of the pawls will then be withdrawn from the rack alternately and the gate will finally reach its lowest position.

It will be observed that the gate may be raised to any desired height and will be maintained in this position by means of the pawls 16 and 15. Thus, as stated, it may be raised to permit smaller animals to go underneath where larger animals cannot pass.

I claim:

1. The combination with a gate post and a gate, of a pivoted handle disposed between the gate and the gate post, and means connected with said handle for raising the gate, said means comprising a handle carrying member pivoted to said gate post, a rack, and a pair of pawls carried by said handle carrying member for engaging said rack.

2. The combination with a gate post and a gate, of a vertical rod, eyes secured to said gate and arranged to slide upon said rod, a pivoted handle disposed between the gate and the gate post and extending at right angles to the gate post, means connected with said handle for raising the gate, said means comprising a handle-carrying member pivoted to said gate post, a rack, and a pair of pawls carried by said handle carrying-member for engaging said rack.

3. The combination with a gate post and a gate, of a vertical rod, eyes secured to said gate and arranged to slide upon said rod, a pivoted handle disposed between the gate and the gate post and extending at right angles to the gate post, means connected with said handle for raising the gate, said means comprising a handle-carrying member pivoted to said gate post, said handle being slidable through said handle-carrying member so as to project on either side of the gate, a rack, a guide member therefor, and a pawl pivoted to said handle-carrying member on each side of said rack.

4. The combination with a gate post and a gate, of a vertical rod, eyes secured to said gate and arranged to slide upon said rod, a pivoted handle disposed between the gate and the gate post and extending at right angles to the gate post, means connected with said handle for raising the gate, said means comprising a bracket secured to said gate post, a guide member provided with a slot secured to said bracket, a rack arranged to slide through the slot in said guide member, an arm on each side of said rack, one of said arms being pivoted to the bracket, and a pawl pivotally carried between said arms on each side of said rack.

JOHN GERST.

Witnesses:
PETER JUNGERS,
ROBT. GARDINER.

---

Copies of this patent may be obtained for five cents each, by addressing the "Commissioner of Patents, Washington, D. C."